United States Patent [19]

Vinot

[11] Patent Number: 4,611,276
[45] Date of Patent: Sep. 9, 1986

[54] DEVICE FOR SUPERIMPOSITION OF THE SUCCESSIVE STAGES OF THE TRANSFER OF DATA AMONG SEVERAL DATA PROCESSING UNITS

[75] Inventor: Daniel R. Vinot, Sucy en Brie, France

[73] Assignee: Compagnie Internationale pour l'Informatique CII-Honeywell Bull, France

[21] Appl. No.: 591,237

[22] Filed: Mar. 20, 1984

Related U.S. Application Data

[63] Continuation of Ser. No. 210,359, Nov. 25, 1980, abandoned.

[30] Foreign Application Priority Data

Jan. 21, 1980 [FR] France ............................ 80 01213

[51] Int. Cl.⁴ .......................................... G06F 13/36
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 4,096,571 | 6/1978 | Vander Mey | 364/200 |
| 4,271,465 | 6/1981 | Ohtsuka et al. | 364/200 |
| 4,296,463 | 10/1981 | Dalboussiere et al. | 364/200 |
| 4,314,335 | 2/1982 | Pezzi | 364/200 |

*Primary Examiner*—Thomas M. Heckler
*Attorney, Agent, or Firm*—Lowe Price LeBlanc Becker & Shur

[57] ABSTRACT

A control logic circuit (C) is provided in each unit such as processors and memories in a multiple processor data processing system. Each control logic circuit (C) is equipped with a priority circuit (P12) which at one input receives the eligible local calls (RQ$_i$L) of the unit itself and at the other input receives external calls (RQ$_k$) transmitted by the other units. The control logic circuit (C) enables control by its unit of a transmission but only when its priority circuit (P12) recognizes that unit as having the highest priority among the other units. The logic circuit (C) together with a T circuit (13) selects local calls as a function of the state of occupation of the data lines of the transmission bus.

4 Claims, 18 Drawing Figures

DEVICE FOR SUPERIMPOSITION OF THE SUCCESSIVE STAGES OF THE TRANSFER OF DATA AMONG SEVERAL DATA PROCESSING UNITS

This application is a continuation of application Ser. No. 210,359 filed Nov. 25, 1980, now abandoned.

TECHNICAL FIELD

The present invention relates generally to a device for the superposition or overlay of the successive stages of the transfer of data among several units of a data processing system. The invention relates more particularly to a data processing system comprising several individual processors and at least one central memory to which each processor may be connected via a system of buses without passing through another processor.

BACKGROUND ART

In a multiple processor data processing system, the transfer bus has the purpose of transmitting data between a transmitting unit and a receiving unit of the system. The system comprises a bus control logic circuit which takes charge of all the calls coming from the transmitting and receiving units and relating to the utilization of the transfer bus. The utilization of this bus occurs in accordance with a fixed or constant priority. Each unit is given a fixed priority and in case of simultaneous calls, the priority circuit takes charge of the call originating from the unit having the highest priority. The bus control logic circuit may be placed in communication with all the units of the system to provide particular data and particular signals in respect of the state and chronology of the system.

This known system has at least two disadvantages. Since there is only one bus control circuit, breakdown of the bus control logic circuit causes all the other units of the system to stop operating. In addition, establishment of connections between transmitting and receiving units is performed by an exchange of address and acknowledgment signals, which takes time.

One solution to these problems involves installing control logic circuitry of the transmission bus into each important unit of the system at the rate of no more than one circuit per unit. Each control logic circuit takes charge of all the calls coming from the units connected to the transmission bus as well as of the calls coming from the particular unit in which it is situated and relating to the utilization of the transmission bus. Each unit is given a fixed priority enabling the same to utilize the transmission bus in accordance with an order of priority. All the control logic circuits are equipped with the same priority circuit for locating the call coming from the unit having the highest priority. All the units are thus apprised of all the units which are calling and by means of its control logic circuit, each unit may recognize itself as having the highest priority for securing control over the transmission bus. Accordingly, failure of a control logic circuit of one unit no longer impedes the operation of the other units. It is only the unserviceable unit which interrupts its interchanges with the others. It is thus no longer necessary to await the acknowledgment of the unit called, since the transfer authorization is produced locally and simultaneously made known to all the other units. In order to secure satisfactory performance in respect of the number of data exchanges on the transmission bus, however, it is necessary to render it possible to multiplex the data exchanged between units, simultaneously in space and time.

DISCLOSURE OF INVENTION

In accordance with the invention, each operation between two transmitting and receiving units may require one or two phases, e.g., START and RESPONSE phases, and the operations between the different units are performed by multiplexing these phases on the transmission bus. The device of the invention renders it possible to superpose the phases relating to different units, provided that there is no simultaneous utilization of the same field of the bus (address, control and data fields). To control this superposition or overlay, each unit initially transmits data specifying the manner in which it intends to make use of the fields for the following cycles. The allocation of the bus to any unit is made as a function of these data.

Still other objects and advantages of the present invention will become readily apparent to those skilled in this art from the following detailed description, wherein we have shown and described only the preferred embodiment of the invention, simply by way of illustration of the best mode contemplated by us of carrying out our invention. As will be realized, the invention is capable of other and different embodiments, and its several details are capable of modifications in various obvious respects, all without departing from the invention. Accordingly, the drawings and description are to be regarded as illustrative in nature, and not as restrictive.

BEST MODE FOR CARRYING OUT THE INVENTION

Figure 1:
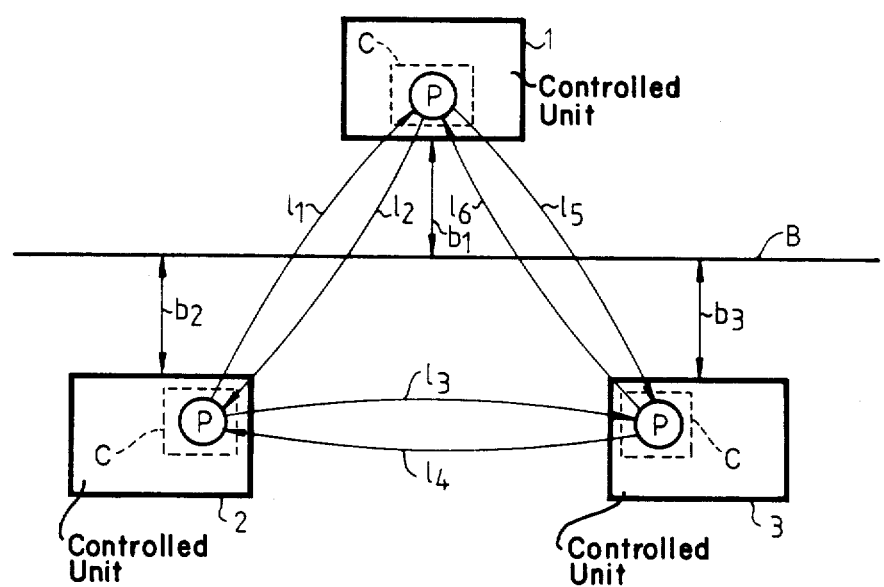
FIG. 1 is a general block diagram of the arrangement of a system in accordance with the invention.

The system illustrated in FIG. 1 comprises units 1, 2 and 3 each connected to a common bus B via connections $b_1$, $b_2$, $b_3$. Each unit 1, 2, 3 has a control logic circuit C including an identical priority circuit P. The calls of each unit 1, 2, 3 for assuming control over the bus B are transmitted to all the other units via the priority circuits P. The unit 1 thus advises the units 2 and 3 that it is the applicant via the connections $I_2$ and $I_5$, the unit 2 advises the units 1 and 3 via the connections $I_1$ and $I_3$ and the unit 3 similarly advises the units 1 and 2 via the connections $I_4$ and $I_6$. At any given instant, it is only the applying unit having the highest priority that assumes control over the trunk B.

Figure 2:
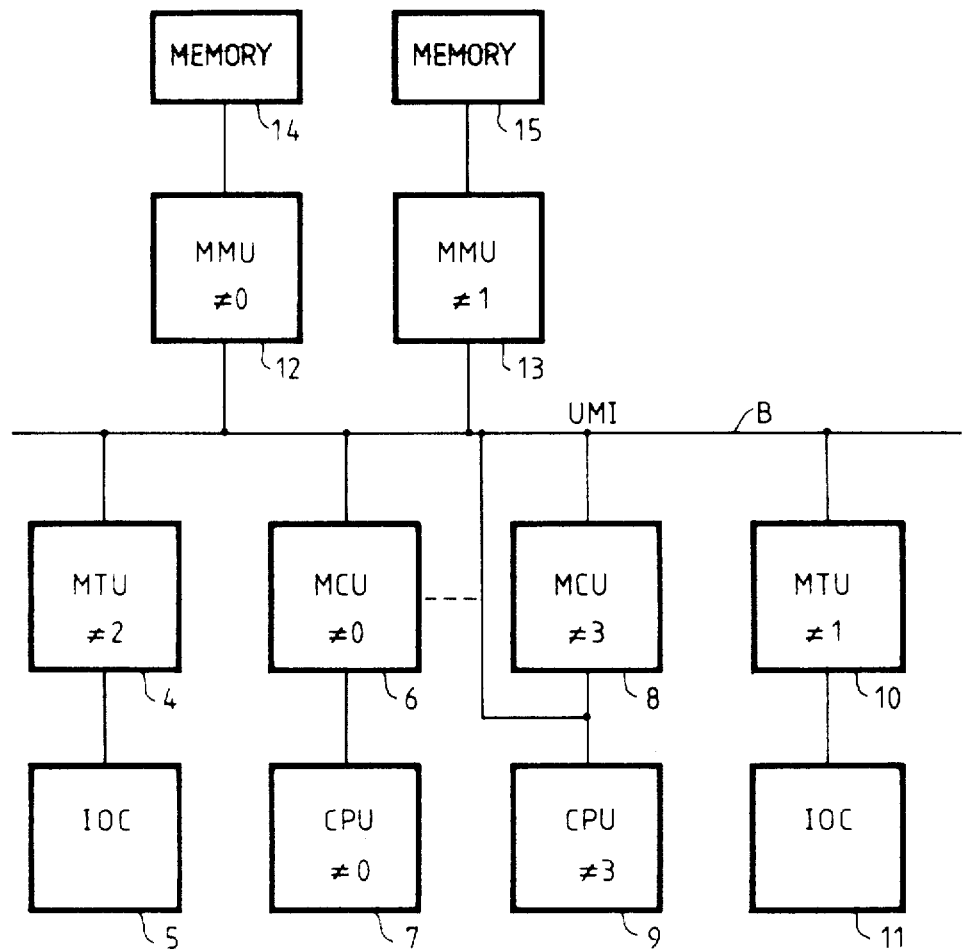
FIG. 2 is a more detailed block diagram showing the arrangement of a particular system wherein the invention is applied.

The units utilized may be of different kinds, as illustrated in FIG. 2. In this figure, the bus B connects memory control units MMU 12, 13 to different cache memories MCU 6–8 or to buffer memories $MTU_4$ and $MTU_{10}$. The buffer memories $MTU_4$ and $MTU_{10}$ connect the input-output controllers IOC 5 and IOC 11 to the bus B whereas the cache memories 6 and 8, respectively, connect the data processing elements or processors 7 and 9 to the bus B.

Figure 3:
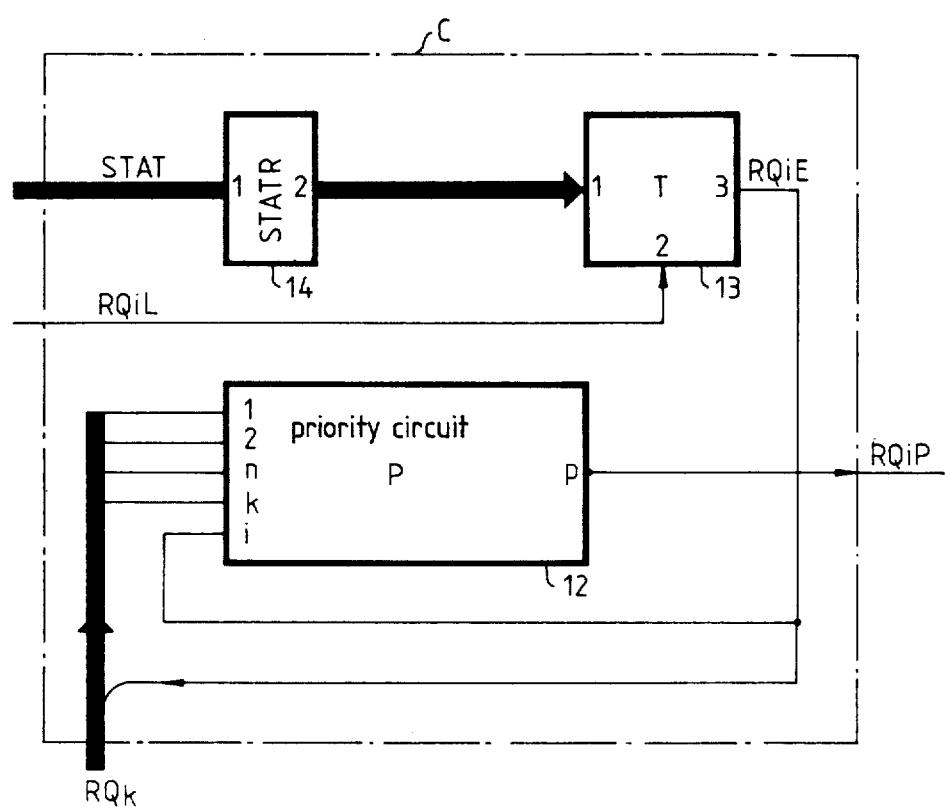
FIG. 3 is a diagram of the components of a control logic circuit in accordance with the invention.

The control logic circuit C in each unit, in accordance with the invention, is illustrated in FIG. 3. This logic comprises a priority circuit 12, a T circuit 13 for eligibility of the local request of the unit in which the circuit P is situated, and a register STATR 14.

At its input terminal 1, the register STATR 14 receives STAT signals representing the availability of the data lines of the bus B. The output terminal 2 of the register STATR is connected to the input terminal 1 of the eligibility circuit T13 whose input 2 receives the local request $RQ_iL$. At its output 3, the T circuit 13 delivers the signal $RQ_iE$ when it has been able to determine that the local request is eligible. The signal $RQ_iE$ is transmitted simultaneously to the input i of the priority circuit 12 and to the control logic circuits of the other units of the system on the line $RQ_k$. The priority circuit 12 delivers a signal $RQ_iP$ at its output terminal P when the local request which had become eligible happens to have the highest priority. This signal $RQ_iP$ is then transmitted to the control element of the local unit which thus receives authorization to assume control over the bus B.

Thus, the task of the control logic circuit C is to convert a local request into an eligible request after having analyzed the availability of the transmission bus B.

The control logic circuit C receives all the external requests $RQ_k$ at the inputs 1 to k of the priority circuit $P_{12}$. The priorities of all the external requests are analyzed and compared to the priority level of the local request by the priority circuit 12. Since the analysis is performed in the same manner in each unit, all the units are apprised at the same instant of the call of the unit which has the highest priority. The unit recognized as having the highest priority may assume control over the bus B by means of the signal $RQ_iP$ transmitted by the priority circuit P.

Figure 4:
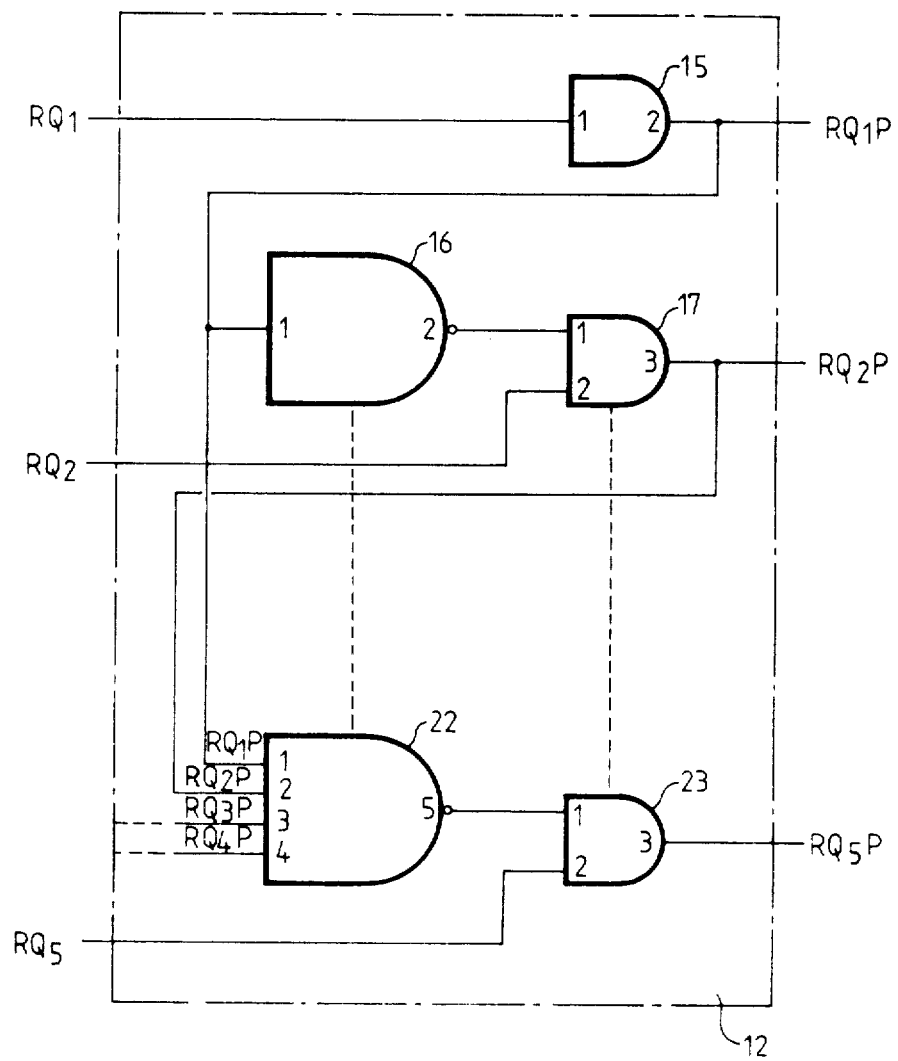
FIG. 4 is a diagram of the priority circuit forming the control logic circuit.

The priority circuit 12 is illustrated in detail in FIG. 4. In the example, this circuit may analyze up to 5 requests $RQ_1$ to $RQ_5$, but this number can be generalized to n. Circuit 12 comprises 4 NAND gates (only two of the gates 16 and 22 being illustrated) and 5 AND gates (only three of the gates 15, 17 and 23 being illustrated).

The request $RQ_1$ is fed to the input 1 of the gate 15 whose output delivers the signal $RQ_1P$. The signal $RQ_1$ P is fed to the inputs 1 of all the NAND gates 16 to 22. The output 2 of the NAND gate 16 feeds the input 1 of the AND gate 17 which receives the request $RQ_2$ at its input 2 and whose output 3 transmits the signal $RQ_2P$. The signal $RQ_2P$ is then transmitted to all the input terminals 2 of the NAND gates 18 to 22. An identical wiring system is established to have the signals $RQ_3$ and $RQ_4$ taken into account by the circuits which are not illustrated. Thus, the signal $RQ_3P$ (not shown) is transmitted to the input 3 of the NAND gates 20 (not shown) and 22 and the signal $RQ_4P$ (not shown) is transmitted to the input 4 of the NAND gate 22. The output 5 of the NAND gate 22 is connected to the input 1 of the AND gate 23 whose input 2 receives the signal $RQ_5$. The output 3 of the AND gate 23 delivers the signal $RQ_5P$. With this circuit, the request $RQ_5$ has priority to the extent that no other request $RQ_1$ to $RQ_4$ is present. This condition is verified by the logic equation:

$$RQ_5P = RQ_5 \cdot (RQ_1P^* + RQ_2P^* + RQ_3P^* + RQ_4P^*).$$

The following equations apply to the signals $RQ_1P$ to $RQ_4P$.

$$RQ_4P = RQ_4 \cdot (RQ_1P^* + RQ_2P^* + RQ_3P^*)$$

$$RQ_3P = RQ_3 \cdot (RQ_1P^* + RQ_2P^*)$$

$$RQ_2P = RQ_2 \cdot (RQ_1P^*)$$

$$RQ_1P = RQ_1$$

Figure 5:
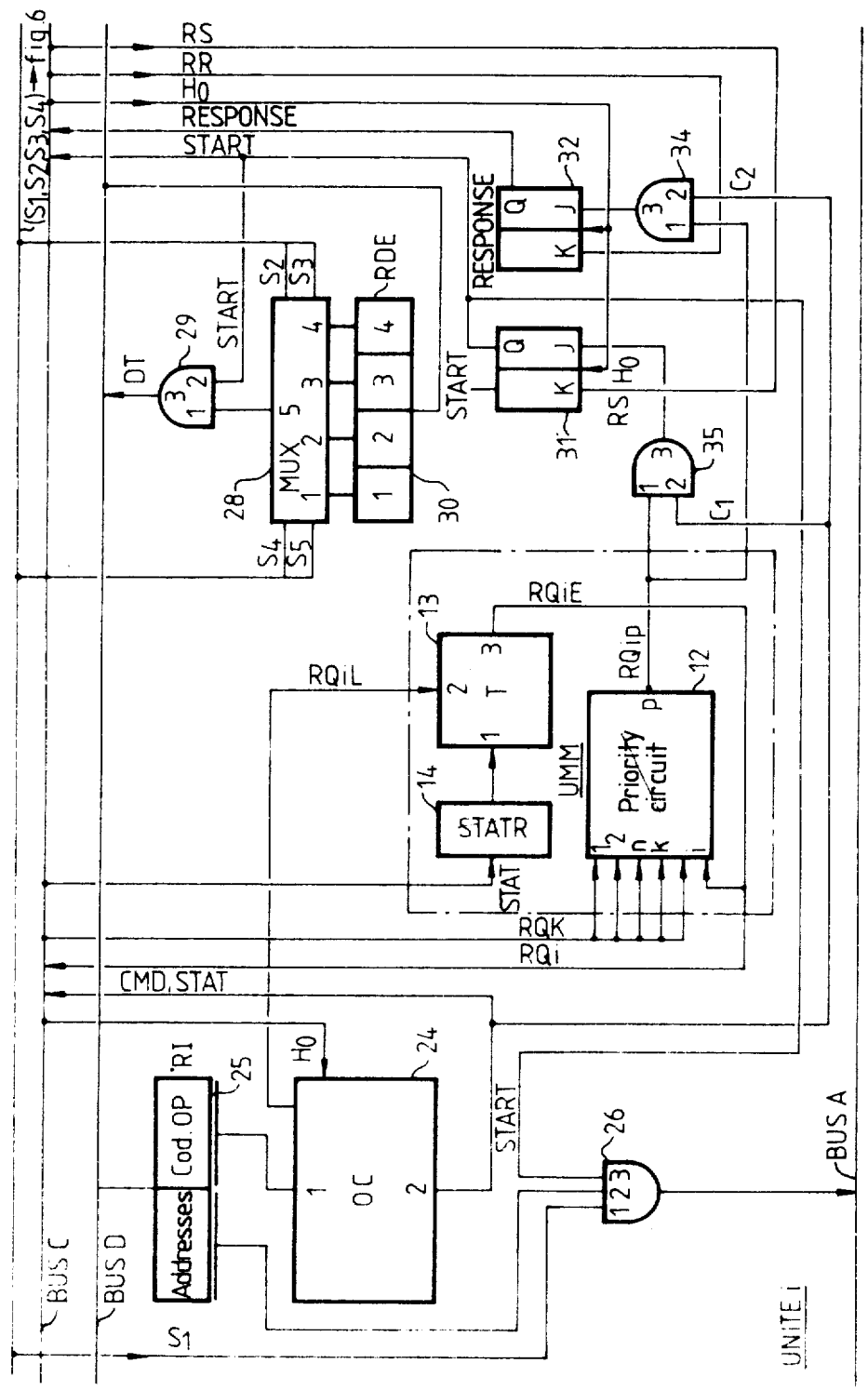
FIG. 5 is a detailed diagram showing the connections of the control logic circuit with the control member of an optional unit forming a data processing system in accordance with the invention.

The connections between the control logic circuit C and the control elements of each optional unit are illustrated in FIG. 5. The unit containing the same is organized around an address bus (BUSA), a control bus (BUSC) and a data bus (BUSD). These different buses are shared in common with the corresponding elements of BUSB. The control element 24 feeds the control signals needed for management of the data transfer on the BUSB when the unit has assumed control. Control element 24 may be formed by a read-only memory into which has been written the microprogram required for sequencing the data on the bus B. Such a control element is well known and is of a kind described in the book "Microprogramming Principles and Practices", Samir S. Husson, Prentice Hall Inc. (1970) at page 189.

The control element 24 delivers the signals CMD and STAT on BUSC, the instructions $C_1$ and $C_2$ as well as the local request signal $RQ_iL$. Element 24 is synchronized by a clock HO (not illustrated) common to the entire system. An instruction register RI 25 connected between the input 1 of the control element 24 and the bus D enables connection to the start address of microprogramming contained in the control element. This start address is calculated on the basis of the code for operating the instruction contained in the instruction register RI 25.

The STAT signals travel on the bus C and are received at the input of the register STATR of the control logic circuit C. The local request $RQ_iL$ is equally transmitted to the input 2 of the T circuit 13 of the control logic circuit C. BUSC is equally traversed by all the RQ requests made by the other units of the system, these being applied to the input terminals 1 to k of the priority circuit 12 of the control logic circuit C. When the unit recognizes that it has priority over the other applicants, its control logic circuit C delivers the signal $RQ_iP$ which is then fed to the input 1 of the AND gate 35.

The signal $RQ_iP$ is detected by a START flip-flop 31 by the action of the control signal $C_1$ on the input 2 of the AND gate 35 or by a RESPONSE flip-flop 32 by the action of a signal $C_2$ on the input 2 of the AND gate 34. The START and RESPONSE flip-flops 31, 32 serve the purpose of initializing a data transfer between the bus B and the unit in which they are situated. These flip-flops 31, 32 are reset to zero, respectively, by the signals RS and RR transmitted on the bus C. The corresponding START and RESPONSE signals are naturally transmitted on the bus C. The register RDE30 is a data register and in this example, this register may contain 4 bytes. These 4 bytes are loaded directly from the bus D and may be discharged over an optional period on the bus D by the multiplexer MUX 28 controlled by cycle signals $S_2$, $S_3$, $S_4$ and $S_5$ transmitted by an internal sequencer of the unit of the kind illustrated in FIG. 6. The discharge occurs during a START transfer phase and is actuated by the START signal fed to the input 2 of the gate 29 whose input 1 is connected to the output 5 of the multiplexer MUX 28. Since an instruction always contains an address, the address contained in the register (RI) 25 is transferred to the address trunk BUSA via the AND gate 26 whose input 2 is connected to the address section of the instruction register 25, this gate being controlled by a cycle signal $S_1$ transmitted by the internal sequencer of the unit of the kind shown in FIG. 6, and by the start signal.

The START and RESPONSE phases occur during the execution of elementary data exchange operations on the bus B. An operation may be defined as an elementary task to be performed by a unit, which may, for example, be an operation to write into or read from a memory. Depending on its nature, an operation may be performed in one or in two separate phases. When an operation requires two phases, the first is the "START" phase and the second is the "RESPONSE" phase. These phases are triggered by means of the corresponding flip-flops of FIG. 5.

Figure 6:
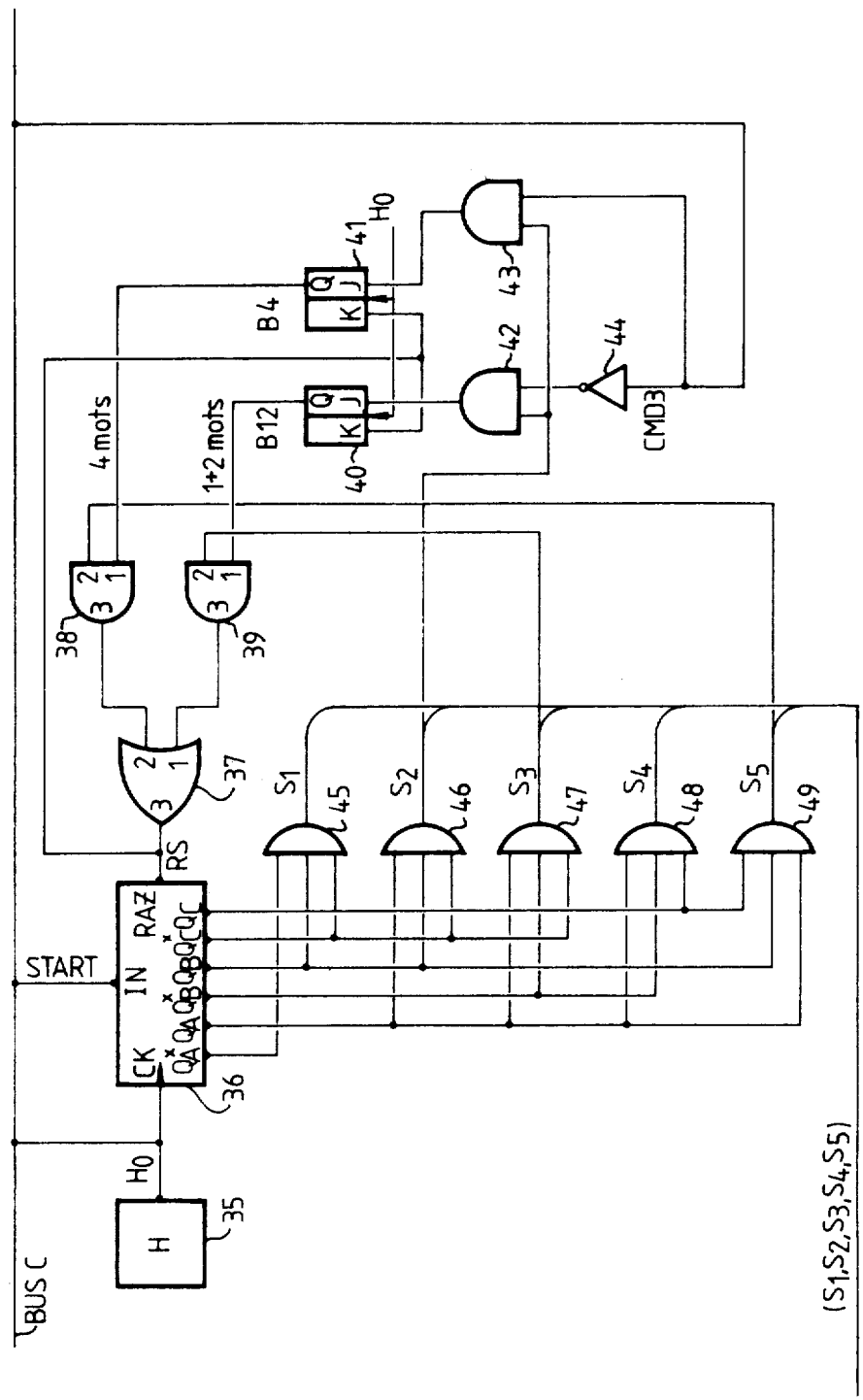
FIG. 6 is a detailed circuit diagram showing the sequencer used in each unit to implement a START sequence.

The interval which separates a START phase from a RESPONSE phase of one and the same operation may be exploited judiciously to perform other operations. A START phase or a RESPONSE phase will obviously require a greater or lesser period for its implementation depending on the nature of the corresponding operation, which period is measured on the basis of the elementary cycle of the clock Ho of the system. The START and RESPONSE phases will consequently be performed as a function of the kind of operation performed in a greater or lesser number of clock cycles of the system. This implementation is consequently synchronized by means of the sequencer of FIGS. 6 and 7. FIG. 6 illustrates the sequencer utilized in each unit to perform a START sequence. It incorporates a binary counter 36 comprising 3 flip-flops. This counter 36 is stepped at the repetition rate of the timing signal Ho of the system applied to its input $C_K$. Stepping of counter 36 is actuated by the START signal transmitted by the START flip-flop 31. The states of this counter are transmitted to the input terminals of the AND gates 45 to 49 which, in a conventional manner, decode the cycles $S_1$ to $S_5$ of the START phase.

During a START phase, the unit transmits data intended for another unit. This transmission may occur over one or more words. For a transmission of one or two words, the flip-flop B12 is set and activates the input 1 of the AND gate 39. For a transmission of 4 words, the flip-flop B4 is set and activates the input 1 of the AND gate 38. The outputs 3 of the gates 39 and 38 are fed, respectively, to the inputs 1 and 2 of an OR gate 37 whose output 3 delivers the signal RS for zero reset of the counter 36.

The inputs 2 of the gates 38 and 39 respectively receive the signals S5 and S3 delivered by the gates 47 and 49. A START sequence which requires a transfer of 1 or 2 words will thus finish at the end of the cycle S3 whereas that which would require a transfer of 4 words would finish at the end of the cycle $S_5$. The decision regarding the length of the transfer is obviously taken by the control element which delivers the signal CMD.

The state of the signals CMD determines the setting of the flip-flop B12 or of the flip-flop B4. The flip-flop B4 assumes the state 1 when $MD_3=1$, whereas it is the flip-flop B12 which assumes the state 1 when $CMD_3=0$. This control occurs during the cycle $S_2$ or the sequencer.

Figure 7:
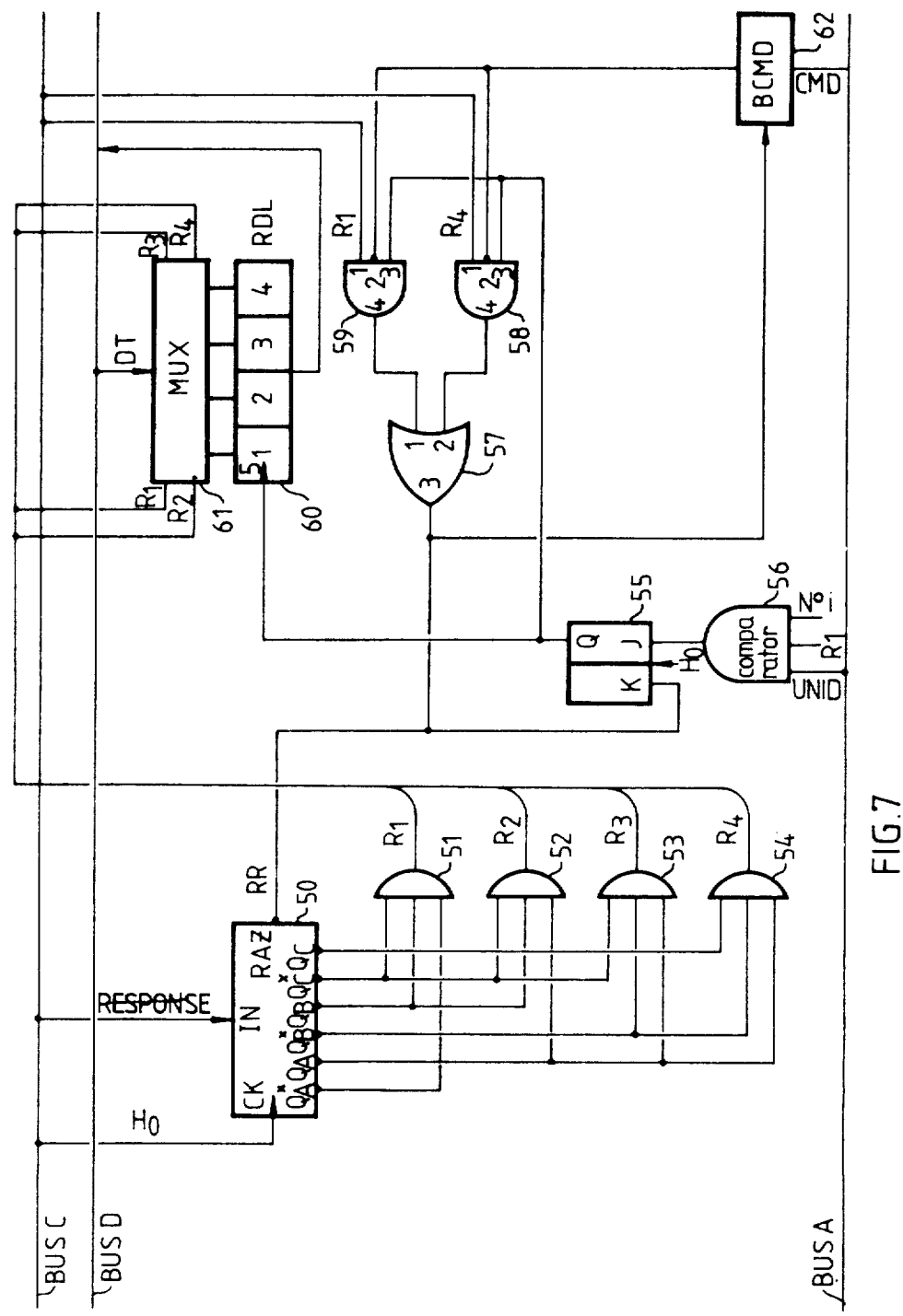
FIG. 7 is a detailed circuit diagram showing the sequencer used in each unit to reimplement a RESPONSE sequence.

FIG. 7 illustrates the sequencer used in each unit to perform a RESPONSE sequence. The sequence incorporates a binary counter 50 comprising 3 flip-flops. This counter 50 is stepped at the repetition rate of the clock signal Ho applied to its input $C_k$. The stepping action is actuated by the RESPONSE signal transmitted by the RESPONSE flip-flop. The outputs of this counter are coupled to the inputs of the AND gates 51 to 54 in such a manner as to decode the cycles $R_1$ to $R_4$.

During a RESPONSE sequence, the unit receives data coming from another unit. The reception may cover one or more words depending on the length of the transfer defined by the field CMD. This field CMD has been transmitted by the unit which had initialized the START sequence and has been stored in the register BCMD62. The unit which performs a response sequence responds to the applying unit by sending its identification number UNID back to it, which enables the applying unit to identify the RESPONSE message transmitted to it. This identification occurs in the comparator 56 which, during the cycle $R_1$, compares the number UNID transmitted by the responder with the identification number i of the unit. If the two numbers are identical, the RESPONSE message relates to the unit, the flip-flop 55 is set in the state 1, and the inputs of the AND gates 58 and 59 as well as the input 5 of the data register RDL are validated. For a response covering one word, the counter 50 is reset to zero at the end of the cycle $R_1$ via the output of the OR gate 57, input 1 of gate 57 is actuated via the output 4 of the AND gate 59 whose inputs are actuated by the field CMD, the signal $R_1$ and the output Q of the flip-flop 55. The word DT transmitted is then stored in the section 1 of the register RDL 60. For a response covering four words, the words are stored one after another in the sections 1 to 4 of the register RDL 60 at the repetition rate of the cycles $R_1$ to $R_4$, via the multiplexer 61. The counter 50 is reset to zero at the end of the cycle $R_4$ by the action of the gate 58 on the OR gate 57.

Figure 8:
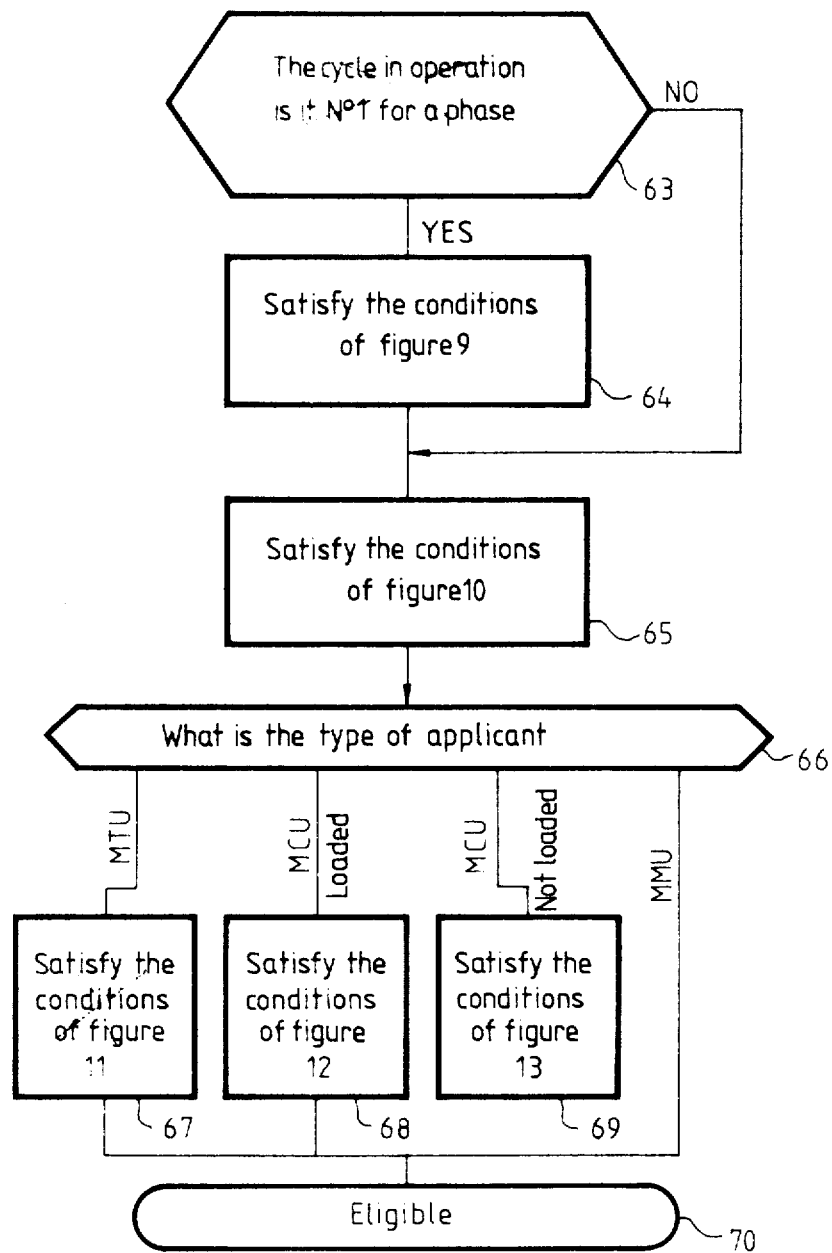
FIG. 8 is a flow chart showing the successive data processing steps or stages required for election of a call in a unit as a function of the type of this unit.

The diagram of FIG. 8 illustrates the operations which must necessarily be performed by a unit to select a local request as a function of its specialization within the system. If the local request occurs during cycle 1 of a phase (step 63), the local request will be eligible if it complies with the logic conditions illustrated in FIG. 9 (step 64). It should thereafter necessarily fulfill the logic conditions illustrated in FIG. 10. During the cycles other than cycle 1, the step 64 need not be implemented, whereas the step 65 is always performed whatever the cycle of a phase. Only one of the steps 67, 68 or 69 is then implemented as a function of the nature of the applicant. If the applicant is an input-output controller, the request should fulfill the logic conditions shown in FIG. 11. If the applicant is a cache memory, a differentiation is made depending upon whether this cache memory is loaded or not. If it is loaded, the application should fulfill the logic conditions of FIG. 12, whereas it should fulfill those of FIG. 13 if it is not loaded.

It will be observed on the basis of the diagram of FIG. 8, that a local request from a storage unit MMU is always eligible without conditions. The logic conditions and their corresponding wiring outlay illustrated in FIG. 9 to 13, are given by way of example only and do not assume any absolute character, actually being dependent on the physical structure of the units making up the system of FIG. 2.

Figure 9:
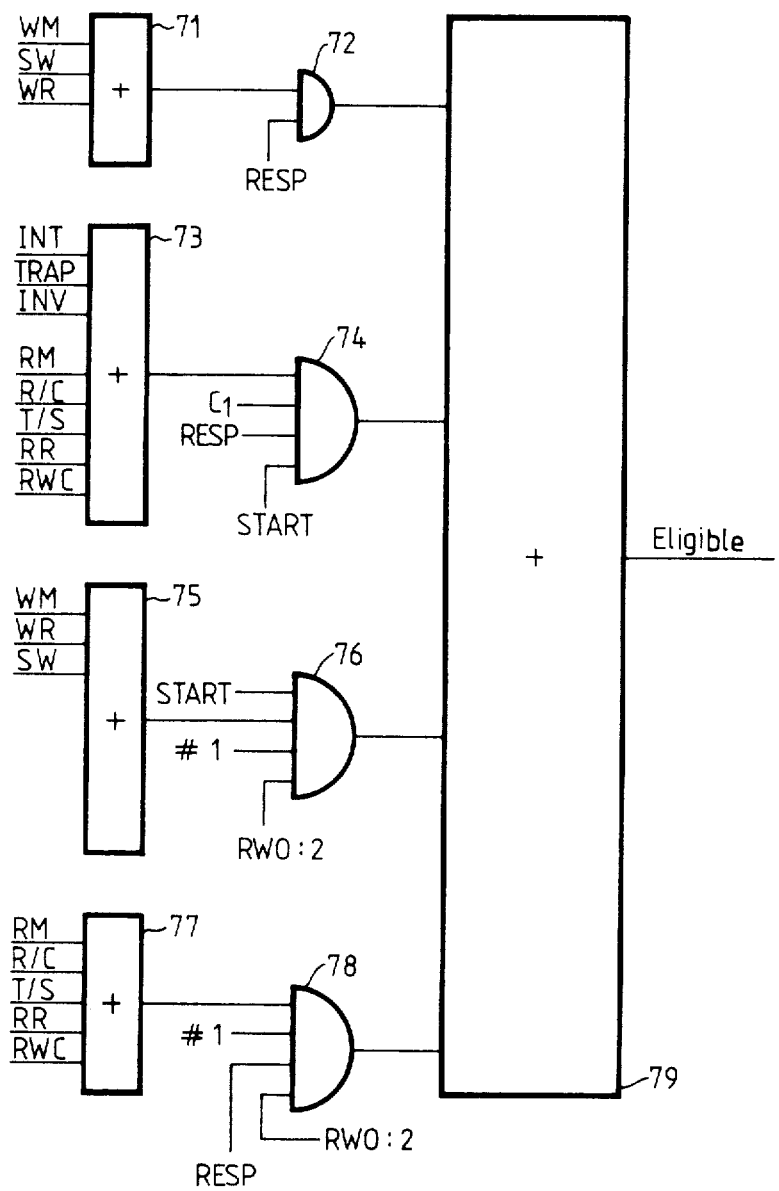
FIGS. 9-13 are detailed diagrams showing the T circuits of each control logic circuit.

In FIG. 9, the OR circuit 71 and the AND gate 72 indicate that the local requests for writing (WM) in the memory MMU, "swapping" (SW) or writing in registers (WR) are not eligible without any conditions in the case of a RESPONSE phase. The circuits 73 and 74 indicate that the local requests for interruption (INT), trapping (TRAP), invalidation (INV), memory readout (RM), writing and cancelling (R/C), testing (T/S), register reading (R/R), reading without comparison, are not eligible in the case of a START phase except during cycle 1 of a response.

The circuits 75 and 76 indicate that the local request for writing in a memory WM, writing in registers WR and for SWAPPING, are not eligible in the case of a START phase except during cycle 1 of a write response. The circuits 77 and 78 indicate that the local requests for reading in a memory (RM), reading and cancellation (RC), testing (T/S), register reading (R/R) and reading without comparison (RWC), are not eligible in the case of a RESPONSE except during cycle 1 of a write response.

Figure 10:
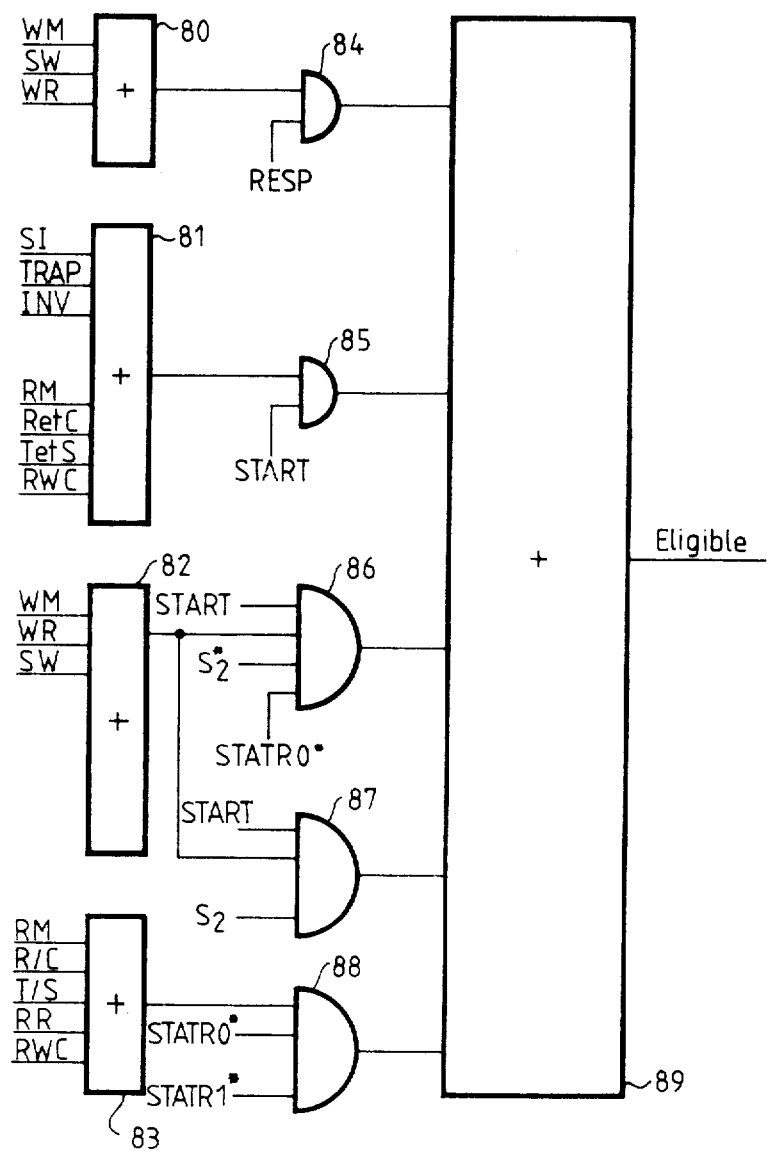

The circuits of FIG. 10 establish the conditions needed to render the local requests eligible as a function of the state of the data lines. The state of the data lines is known from the value of the contents of the STATR register 14. This register 14 comprises two flip-flops. The state of register 14 is read during any cycle, a state 00 during a cycle n meaning that the data lines become available during the cycle n+1, the state 01 renders them available during cycle n+2, the state 10 renders them available during the cycle n+3, and the state 11 renders them available during the cycle n+4. The wiring of the circuits of FIG. 10 corresponds to the following truth table:

|  | Type of local request | STATR 0:2 |
|---|---|---|
| RE-SPONSE | write in memory (WM) | immaterial |
|  | swapping (SW) | immaterial |
|  | write in register (WR) | immaterial |
| START | interruption (INT) | immaterial |

-continued

|  | Type of local request |  | STATR 0:2 |
|---|---|---|---|
| START | trap (TRAP) |  | immaterial |
|  | invalidation (INV) |  | immaterial |
|  | read memory (RM) |  | immaterial |
|  | read cancellation (RC) |  | immaterial |
|  | testing and marking (TS) |  | immaterial |
|  | read register (RR) |  | immaterial |
|  | read without comparison (RWC) |  | immaterial |
| START | write memory | cycle different |  |
|  | write register | from cycle No. | 0 X |
|  | swapping | 2 of a START |  |
|  |  | cycle No. 2 | never |
|  |  | of a START | eligible |
| RE-SPONSE | read memory (RM) |  |  |
|  | read and cancel (RC) |  |  |
|  | test and mark (T/S) |  | 0 0 |
|  | read register |  |  |
|  | read without comparison |  |  |

Figure 11:
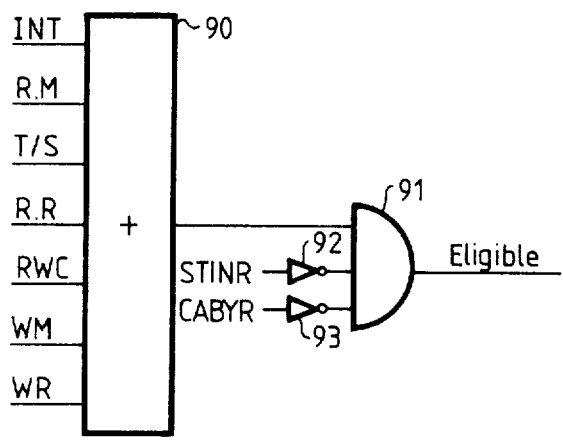

The following truth table makes it possible to make eligible the local requests of an input-output controller (MTU). The corresponding logic circuit is shown in FIG. 11.

|  | Type of request | STINR | CABYR |
|---|---|---|---|
| START | interruption (INT) | 0 | 0 |
| START | read memory (RM) |  |  |
|  | test and mark (T/S) |  |  |
|  | read register (RR) | 0 | 0 |
|  | read without comparison (RWC) |  |  |
| START | write memory (WM) |  |  |
|  | write register (WR) | 0 | 0 |

STINR=1 prohibits the transmission of the START signals.

Figure 12:
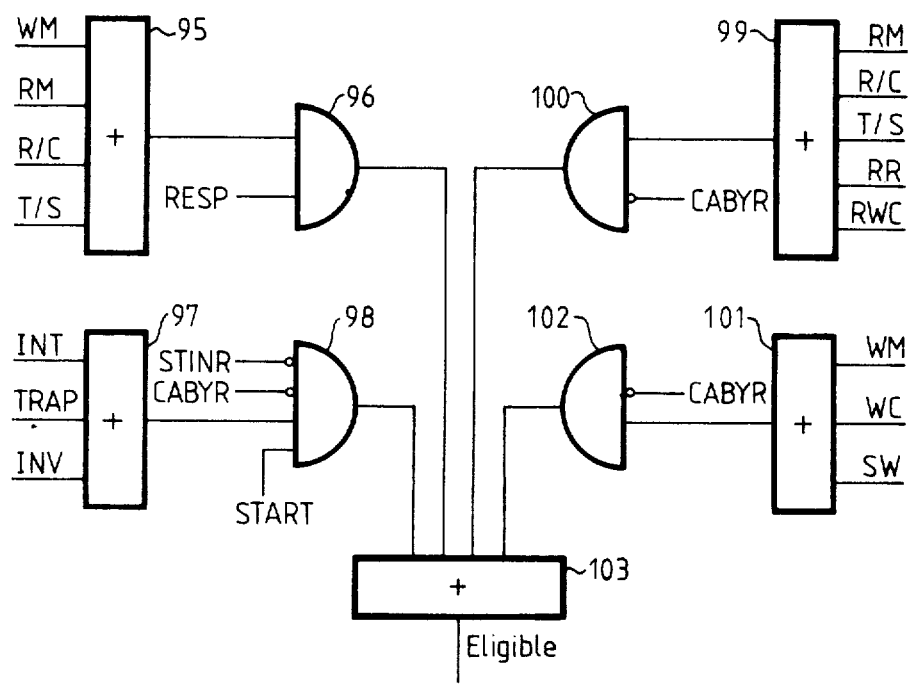

The following truth table makes it possible to make eligible the local request transmitted by a cache memory unit when it is loaded. The corresponding logic circuit is illustrated in FIG. 12.

|  | Type of request | STINR | CABYR |
|---|---|---|---|
| RESPONSE | write memory (WM) |  |  |
|  | read memory (RM) |  |  |
|  | read and cancel (RC) | X | X |
|  | test and mark (T/S) |  |  |
| START | interruption (INT) |  |  |
|  | trap (TRAP) | 0 | 0 |
|  | invalidation (INV) |  |  |
| START | read memory (RM) |  |  |
|  | read and cancel (RC) |  |  |
|  | test and mark (T/S) | 0 | 0 |
|  | read register (RR) |  |  |
|  | read without comparison (RWC) |  |  |
| START | write memory (WM) |  |  |
|  | write register (WR) | 0 | 0 |
|  | swapping (SW) |  |  |

Figure 13:
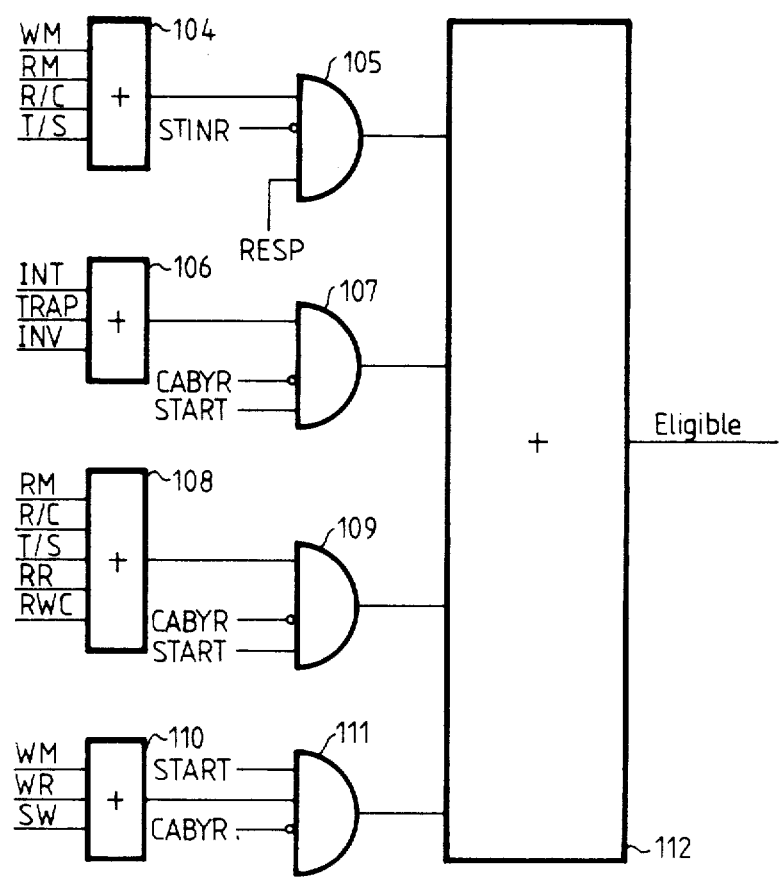

The following truth table makes it possible to make eligible the local requests transmitted by an unloaded cache memory unit. The corresponding logic circuit is illustrated in FIG. 13.

|  | Type of request | STINR | CABYR |
|---|---|---|---|
| RESPONSE | write memory (WM) |  |  |
|  | read memory (RM) |  |  |
|  | read and cancel (RC) | 0 | X |
|  | test and mark (T/S) |  |  |
| START | interruption (INT) |  |  |

| | Type of request | STINR | CABYR |
|---|---|---|---|
| START | trap (TRAP) | 0 | 0 |
| | invalidation (INV) | | |
| | read memory (RM) | | |
| | read and cancel (RC) | | |
| | test (T/S) | 0 | 0 |
| | read register (RR) | | |
| | read without comparison (RWC) | | |
| START | write memory (WM) | 0 | 0 |
| | write register (WR) | | |
| | swapping (SW) | | |

Figure 14:
FIG. 14 is a timing diagram showing the operations performed during an operation to write a word in the central memory MMU of FIG. 2.

The operation of the device in accordance with the invention is illustrated by the timing diagrams of FIG. 14 to 17. In FIG. 14, the unit having priority performs an operation writing a data word into a memory unit MMU. Its control logic circuit C triggers a START phase comprising the elementary cycles $S_0$ to $S_3$. During the cycle $S_1$, the address of the memory is transmitted by the unit selected on the address lines of the bus A, and the instruction word CMD is equally transmitted by the control element of the unit to advise the memory unit that a write operation is requested.

During the cycle $S_2$, the field CMD is transmitted again on the control lines of the bus B to advise the memory unit that a word write operation is requested, and the data word DT is transmitted by the unit having priority to the memory unit MMU.

The response of the memory unit MMU occurs when the latter acquires priority in its turn. This is performed in two cycles $R_0$ and $R_1$ according to FIG. 14. During the cycle $R_1$, the word UNID for identification of the unit which awaits the reply is transmitted on the control lines and a fault check code is transmitted to check that the write operation has occured satisfactorily.

Figure 15:
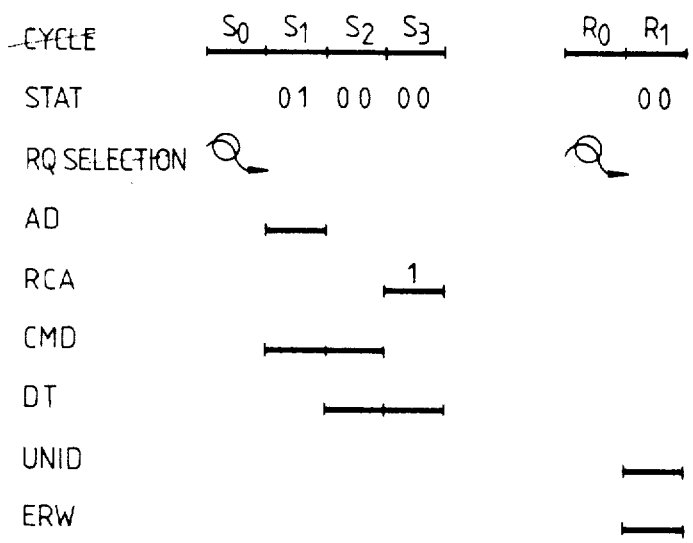
FIG. 15 is a timing diagram showing the operations to write two words into a cache memory MCU of FIG. 2.

FIG. 15 illustrates a cycle for writing two words into a cache memory unit. Since the operation in question is that of writing two words, the signal STAT has the value 01 during the cycle $S_1$, then the value 00 during the cycle $S_2$, the transfer of data occuring during the cycle $S_2$ and $S_3$. The response occurs as previously.

Figure 16:
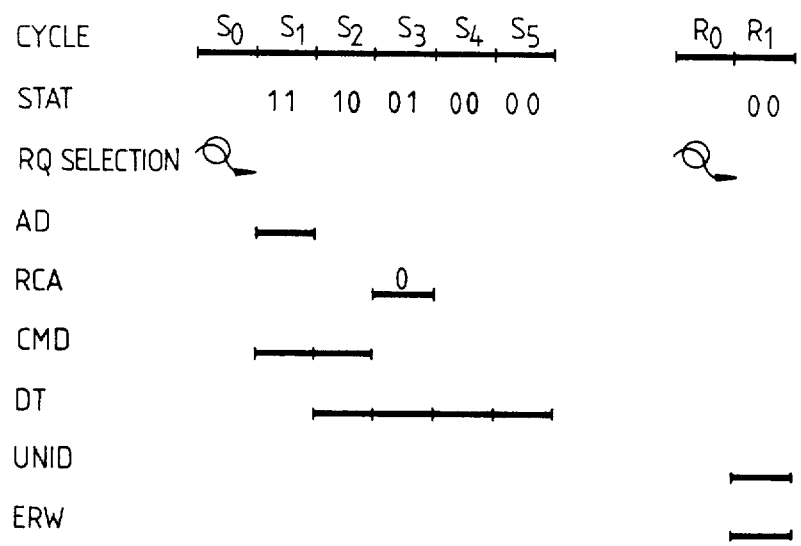
FIG. 16 is a timing diagram illustrating the operations performed upon writing four words into a memory MMU of FIG. 2.

FIG. 16 corresponds to a write operation of 4 words in a memory MMU. In this case, STAT has the value 11 during the cycle $S_1$, 10 during the cycle $S_2$, 01 during the cycle $S_3$ and 00 during the cycle $S_4$, the transfer of the 4 words occurring during the cycles $S_2$ to $S_5$. The response occurs as previously.

Figure 17:
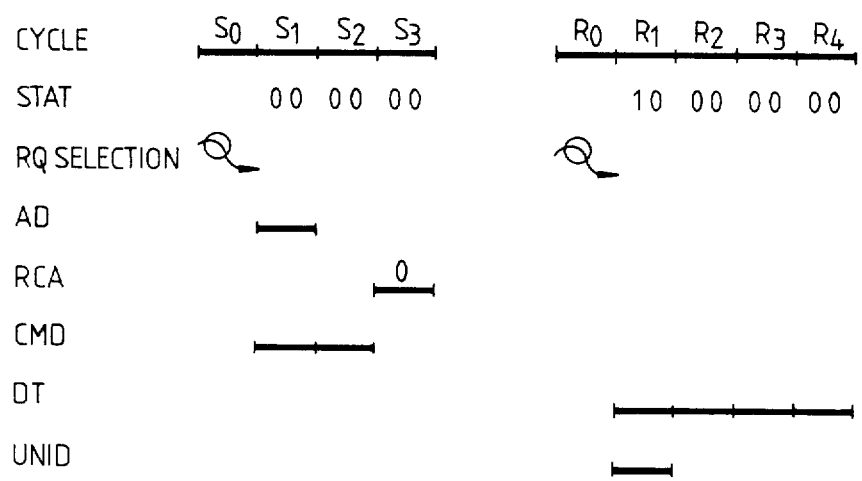
FIG. 17 is a timing diagram illustrating the operations performed upon reading four words in the memory MMU of FIG. 2.

FIG. 17 illustrates a read cycle for a memory unit MMU. The STAT phase is implemented to address the memory during the cycle $S_1$ and to actuate the read operation during the cycle $S_1$ as well as the length of the transfer during the cycle $S_2$. In the example of FIG. 17, the operation in question is that for reading 4 words in a memory. These 4 words are transferred to the applying unit during the implementation of the RESPONSE phase of the memory MMU. During the cycle $R_1$, STAT is placed in the state 10 to indicate that the data lines will be available after the cycle $R_4$.

Figure 18:
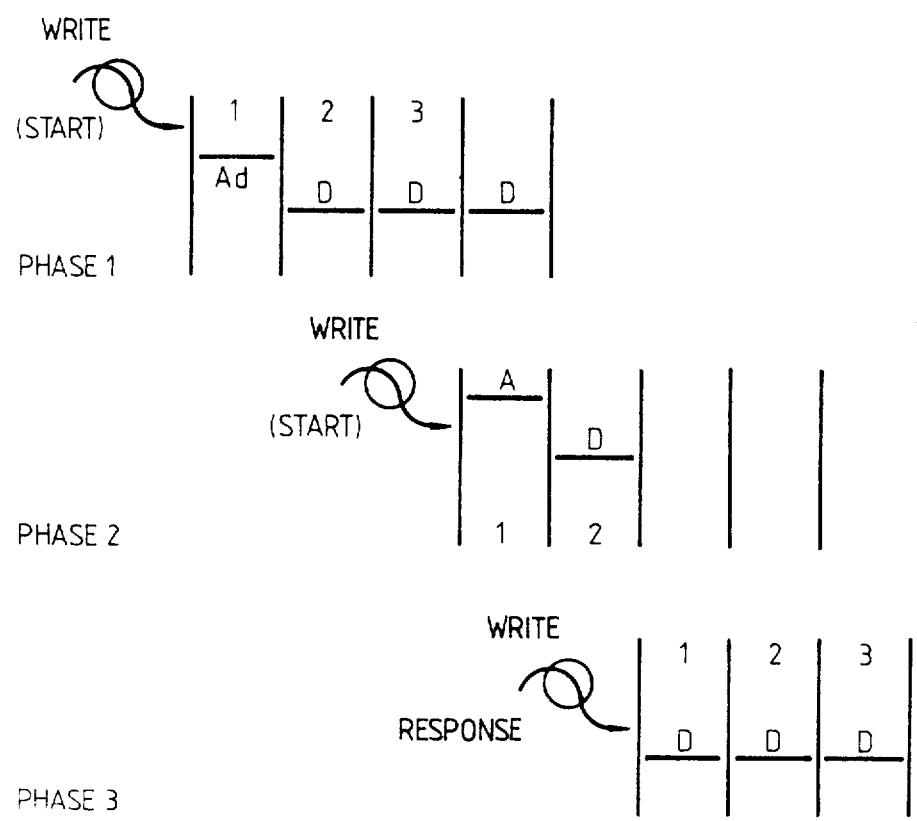
FIG. 18 shows an example of chronological and spatial multiplexing of the address and data lines of the transmission bus for two successive START phases followed by a RESPONSE phase.

An example of chronological and spatial multiplexing of the address and data lines is illustrated in FIG. 18. The first phase (phase 1) illustrated in this figure is a START phase for writing 3 data words. The cycle 1 is utilized for transmission of the address field and the 3 following cycles are utilized for transmission of the 3 data fields. The data lines will be available at the end of cycle 4, all of the units being apprised by the state of the STAT lines. Another phase may be executed in these circumstances, e.g., a START phase for writing one word. This START phase may be initiated by dispatch of the address field during cycle 4 of the preceding phase since the corresponding address lines are unoccupied at this time. The data lines are available again at the end of cycle 2 of the second phase illustrated, when it will be possible to perform a RESPONSE phase 3 for reading 3 words, etc. Consequently, it is clear that thanks to the superposition of the START and RESPONSE phases it is possible to obtain uninterrupted data transfer cycles on the transmission bus.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. A system for superposing successive phase of data transfer on a transmission bus having data, address and control sections common to a plurality of data processing units, each said unit including a control logic circuit, comprising:

a programmed control means;

means responsive to said control means for establishing a multiple cycle operating phase of said unit;

means for storing data to be transmitted on the data section of the bus to another one of said units or to be received from said another one of said units and for storing an address of said another one of said units;

means responsive to said control means for applying to the bus a unit status signal indicating any utilization of the bus by said unit itself;

means responsive to the control means for generating a local request signal requesting access to the bus during a current operating phase of the unit;

first monitoring means monitoring said bus and responsive to the control means for generating a bus occupation signal to determine whether the bus currently is in utilization by another one of said units;

said control means including second monitoring means monitoring said bus for generating a status signal depending upon bus status defining utilization of the bus by said unit for subsequent cycles of the same operating phase of the unit itself;

priority means monitoring said bus and said local request signal for measuring priorities of the local request signal and request signals on the bus generated respectively by other ones of said units, and in response for generating a priority local request signal if the priority of the local request signal is determined to be the highest;

first cycle generator means controlled by said multiple cycle operating phase establishing means responsive to a priority local request signal and said second monitoring means for controlling said unit to transmit data stored in said storage means to said another one of the units on the bus; and second cycle generator means controlled by said multiple cycle operating phase establishing means and responsive to said priority local request signal for controlling said unit to receive data from said another one of said units on the bus.

2. The system of claim 1, wherein each said unit includes means responsive to said control means and operative during a second cycle of the first cycle generator for transmitting onto the control section of said bus data defining the length of data to be transmitted by said unit itself.

3. The system of claim 1, wherein each said unit includes means controlled by said second cycle generator means and operative during a first cycle of the second cycle generator means for transmitting onto the address section of said bus an address of said another one of said units.

4. The system of claim 1, wherein each said unit further includes means responsive to said first cycle generator and operative during a first cycle of the first cycle generator means for controlling and reading data stored in said another one of said units.

* * * * *